US007865290B2

(12) United States Patent
Gibson et al.

(10) Patent No.: US 7,865,290 B2
(45) Date of Patent: Jan. 4, 2011

(54) VALVE CONTROL SYNCHRONIZATION AND ERROR DETECTION IN AN ELECTRONIC VALVE ACTUATION ENGINE SYSTEM

(75) Inventors: Alex O'Connor Gibson, Ann Arbor, MI (US); Donald Lewis, Howell, MI (US); Nate Trask, Dearborn, MI (US); Brian C. Moorhead, Willis, MI (US); Vincent J. Winstead, Mankato, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 712 days.

(21) Appl. No.: 11/869,366

(22) Filed: Oct. 9, 2007

(65) Prior Publication Data

US 2009/0093939 A1 Apr. 9, 2009

(51) Int. Cl.
*G06F 19/00* (2006.01)
*F01L 1/34* (2006.01)
*F01L 9/04* (2006.01)
*F02P 5/15* (2006.01)
*F02M 51/00* (2006.01)

(52) U.S. Cl. .................... 701/103; 701/115; 123/90.11; 123/90.15; 123/406.47; 123/478; 702/89

(58) Field of Classification Search ............. 123/90.11, 123/90.15–90.18, 90.31, 347, 348, 406.47, 123/478, 480; 701/101–105, 110, 111, 114, 701/115; 251/129.01, 129.04, 129.15; 702/85, 702/89, 182, 183
See application file for complete search history.

(56) References Cited

U.S. PATENT DOCUMENTS 3,745,765 A * 7/1973 Raebiger .................... 60/530
4,612,844 A * 9/1986 Byford .................... 91/363 A
5,209,202 A 5/1993 Maurer et al.
5,748,923 A 5/1998 Eitrich
5,918,195 A * 6/1999 Halgrimson et al. .......... 702/94
6,178,867 B1 * 1/2001 Kovac ........................ 91/171
6,278,932 B1 8/2001 Baumel et al.
6,567,740 B2 5/2003 Eichenseher et al.
6,606,552 B2 8/2003 Haimerl et al.
6,810,841 B1 * 11/2004 Peterson et al. .......... 123/90.11
7,107,951 B2 * 9/2006 Urushihata et al. ....... 123/90.17

FOREIGN PATENT DOCUMENTS

EP 1136659 A2 * 9/2001 ............. 123/90.11

* cited by examiner

*Primary Examiner*—Willis R Wolfe, Jr.
(74) *Attorney, Agent, or Firm*—Allan J. Lippa; Alleman Hall McCoy Russell & Tuttle LLP

(57) ABSTRACT

A system for controlling a multiple cylinder internal combustion engine with electromagnetic valve actuation, comprising of at least one cylinder with an engine cylinder valve, a second controller operably coupled to the engine cylinder valve, said second controller configured to adjust at least one of the valve opening and closing timing of the engine cylinder valve, and a first controller connected with the second controller over a first link and a second link, wherein the first controller is configured to send an engine position indication signal to the second controller over the first link and receive a status signal from the second controller over the second link, and wherein the first controller outputs a synchronization degradation signal responsive to a synchronization error between the engine position indication signal and the status signal.

25 Claims, 4 Drawing Sheets

VALVE CONTROL SYNCHRONIZATION AND ERROR DETECTION IN AN ELECTRONIC VALVE ACTUATION ENGINE SYSTEM

BACKGROUND AND SUMMARY

In an electronic valve actuation (EVA) engine, the intake valve timing may be controlled on a cylinder by cylinder basis. In one example configuration, the intake valves may be controlled by a separate valve control unit (VCU), sometimes referred to as a valve controller, that responds to valve timing commands from the engine control module (ECM) by opening and closing the intake valves in a manner that is synchronized with the application of spark and fuel timing. One issue with using a VCU that operates separately from the ECM is in maintaining synchronization between the two control modules. In particular, during operation, the VCU internal clock may become time shifted from the ECM clock which may result in reduced intake valve control accuracy.

One approach for addressing this issue is to send synchronization messages between the ECM and the VCU via a control area network (CAN). However, the inventors have recognized some short-comings with this approach. For example, the ECM may be configured to send event based messages (i.e., messages that are related to some physical engine event) over a CAN link to the VCU once every 90 crank angle degrees. If the VCU also uses event based CAN messaging then it may not be possible to measure a synchronization error of less than the event spacing, i.e., 90 crank angle degrees. Further, even if the VCU uses an interrupt service routine or a polling system that is not based on event based messaging, variations in CAN message timing may lead to synchronization errors between an ECM and VCU.

One example approach to overcome at least some of the disadvantages of the prior approach includes sending an engine position indication signal from a first controller to a second controller over a first link, sending a status signal from the second controller to the first controller over a second link, and synchronizing the second controller and the first controller according to the engine position indication signal and the status signal.

In a second approach, also described herein, the above short-comings may be addressed by a system with at least one cylinder with an engine cylinder valve, a second controller operably coupled to the engine cylinder valve, the second controller configured to adjust at least one of the valve opening and closing timing of the engine cylinder valve, and a first controller connected with the second controller over a first link and a second link, wherein the first controller is configured to send an engine position indication signal to the second controller over the first link and receive a status signal from the second controller over the second link, and wherein the first controller outputs a synchronization degradation signal responsive to a synchronization error between the engine position indication signal and the status signal.

The present description provides several advantages. In particular, if an engine position indication signal, such as a composite top dead center (TDC) signal degrades, e.g. less than a complete data set is received than is transmitted, then a VCU to ECM synchronization error can be calculated by comparing an internal ECM TDC edge timing to the VCU status signal edge timing. Additionally, if the VCU status signal degrades then a synchronization error can be calculated within the VCU by comparing its TDC timing with the composite TDC signal edge timing, and then the synchronization error can be transmitted to the ECM over the CAN link for engine control purposes. Further, in the case that both the composite TDC and VCU status signals degrade, a cylinder ID timing can be transmitted from the VCU to the ECU, with sufficient resolution to provide an additional means of detecting VCU to ECM synchronization errors.

The above advantages and other advantages, and features of the present description will be readily apparent from the following Detailed Description when taken alone or in connection with the accompanying drawings.

DETAILED DESCRIPTION

Figure 1:
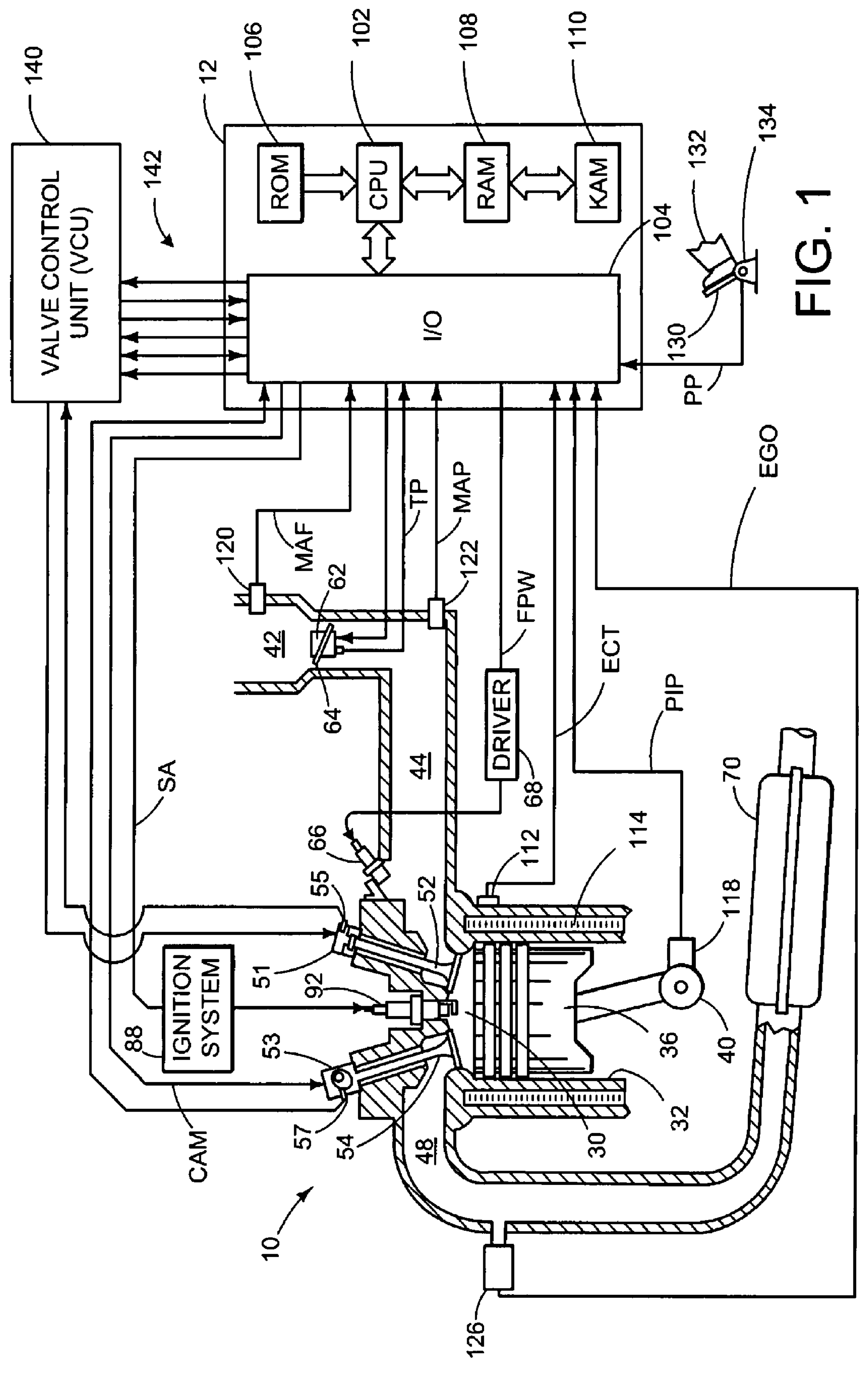
FIG. 1 shows a schematic depiction of one cylinder of an example engine system including an electronically actuated intake valve.

FIG. 1 is a schematic diagram showing one cylinder of multi-cylinder engine 10, which may be included in a propulsion system of an automobile. Engine 10 may be controlled at least partially by a control system including controller (also referred to as electronic control module) 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 may be controlled by valve control unit (VCU) 140 via electric valve actuator (EVA) 51. During some conditions, VCU 140 may receive vehicle operating condition information via communication with controller 12 and may vary the signals provided to actuator 51 to control the opening and closing of the intake valve. Further, exhaust valve 54 may be controlled by cam actuation via cam actuation system 53 which may include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In one example, the signals indicate the position of the valve in relation to a cam position or cam angle referenced as signal CAM.

Note the ECM to VCU interface 142 may include a plurality of control lines that may facilitate communication between VCU 140 and controller 12. Interface 142 and communication between VCU 140 and electronic control module 12 will be discussed in further detail below with reference to FIG. 2.

The above described valve configuration may be herein referred to as an intake-only electronic valve actuation system or an iEVA system. Although methods relating to VCU and ECM synchronization may be described below in view of an iEVA system, it will be appreciated that the methods may further be applied to an exhaust-only EVA system or an intake and exhaust EVA system.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller or electronic control module (ECM) 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Such a pattern of pulses may be generally referred to as a pulse train. As described in further detail below, various different pulse trains from different sensors may be utilized to determine synchronization of the different controllers of the engine system.

In some embodiments, the plurality of sensors positioned throughout the engine system may communicate with the ECM via a controller area network (CAN) which may be referred to herein as the vehicle CAN.

Note in some embodiments, VCU 140 may be a microcomputer and may include computing components similar to that of ECU 12. As described above, FIG. 1 shows only one cylinder of a multi-cylinder engine, and that each cylinder may similarly include its own set of intake/exhaust valves, fuel injector, spark plug, etc. Further, each cylinder may include one or more intake and/or exhaust valves that may be controlled by VCU 140 and/or ECM 12 via electronic valve actuation or cam actuation.

Figure 2:
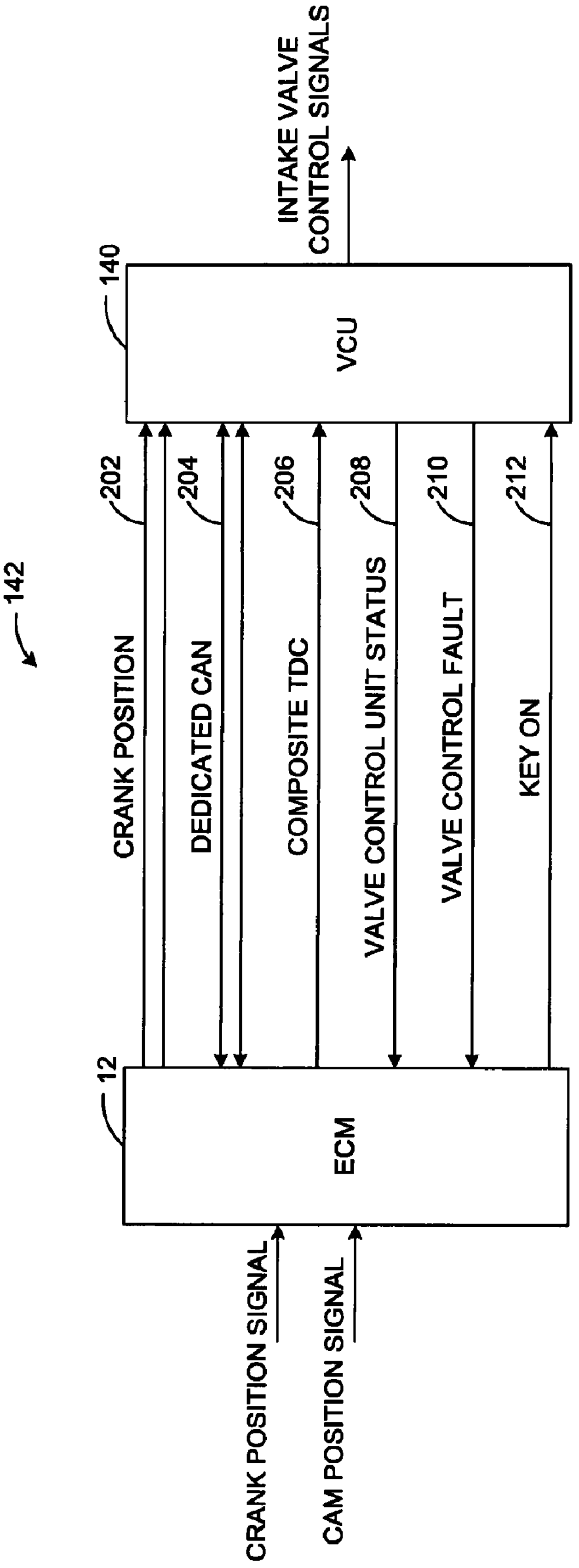
FIG. 2 shows a schematic block diagram of an electronic control module in electronic communication with a valve control unit.

FIG. 2 shows a schematic diagram of an example interface between the ECM and the VCU. In this example configuration, ECM to VCU interface 142 includes six different signal connections for communicating various operating conditions/parameters between the ECM and the VCU, although more or less may be used. In particular, the VCU may receive engine system operating information from the ECM via interface 142 which may be used to control valve operation of the intake valves of the respective cylinders. Further, the VCU may send information to the ECM via interface 142. ECM 12 may receive, among other signals, a crank position signal (CPS) and a CAM signal which may be passed onto the VCU via the interface 142, then the VCU may send intake valve control signals to actuators of the intake valves.

ECM to VCU interface 142 may include CPS line 202 to transmit a digital crank position signal (CPS) from the ECM to the VCU. In some embodiments, the CPS signal may be sent to the ECM from a VR sensor or in some cases may be adapted from the PIP signal sent to the ECM. In some embodiments, CPS line 202 may be a twisted pair connection to facilitate greater bandwidth and may reduce electromagnetic interference from external sources.

In some embodiments, ECM to VCU interface 142 includes a dedicated CAN line 204 to transmit messages between the ECM and the VCU and vice versa. Dedicated CAN line 202 may be a twisted pair connection that may facilitate greater bandwidth and may reduce electromagnetic interference from external sources. The messages transmitted by the ECM may include ECM status information and ECM command information sent to the VCU. In one example configuration, the ECM may send ECM status information messages to the VCU every 90 crank angle (CA) degrees or at the least one message in a period of 16 ms. In one example, ECM status information may include a VCU enable signal, cylinder signal, engine speed signal, engine load signal, and an ECM TDC counter signal. Further, the ECM may send ECM command information message to the VCU every 90 CA degrees or as required to schedule/update intake valve opening/intake valve closing events for startup and low engine speeds. In one example, ECM command information may include a valve mode signal for each intake valve, an intake valve open target angle signal for each intake valve, and an intake valve close target angle signal for each intake valve.

Furthermore, the messages transmitted by the VCU may include VCU module status information and VCU cylinder status information sent to the ECM. In one example configuration, the VCU may send VCU module status messages to the ECM every 90 CA degrees or at least one message in a maximum period of 16 ms or immediately upon receiving a change in VCU ready, synchronization status, or valve closure degradation signals. In one example, VCU module status information may include a VCU ready signal, a synchronization status signal, a CPS status signal, a CAM status signal, a power supply status signal, a temperature status signal, a valve closure degradation signal, a VCU TDC counter signal, and a VCU power signal. Further, the VCU may send VCU cylinder status messages to the ECM every 90 CA degrees. In one example, VCU cylinder status information may include a valve state signal for each intake valve, an intake valve opening error signal for each intake valve, and an intake valve closing error signal for each intake valve.

Figure 3:
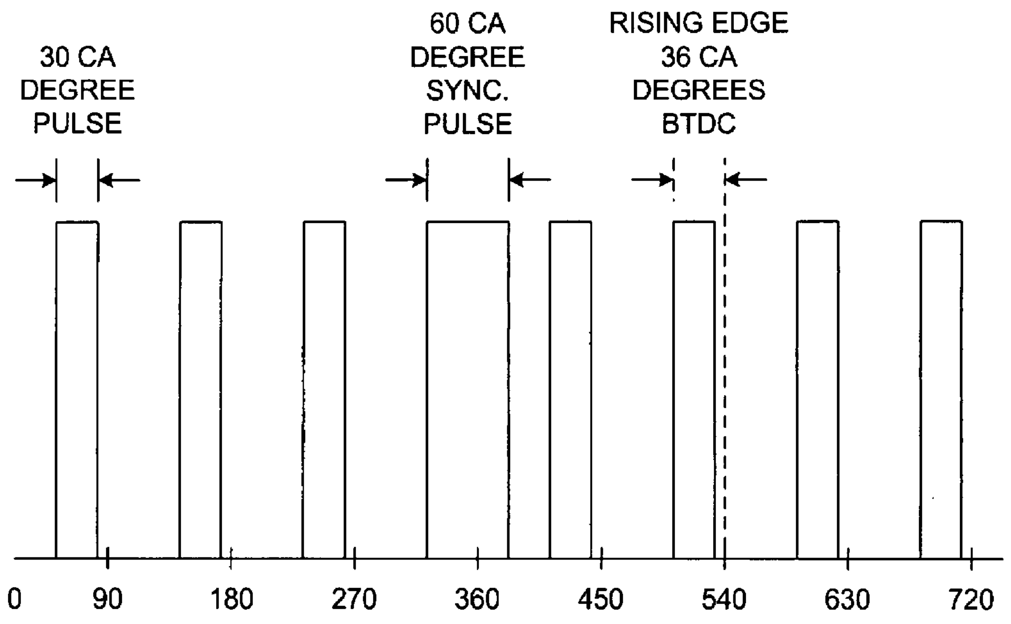
FIG. 3 shows an example pulse train generated by the electronic control module that indicates a composite cam signal including a cylinder identifier.

ECM to VCU interface 142 may include composite TDC line 206 that may transmit a modified or composite CAM signal that includes a cylinder one TDC identifier from the ECM to the VCU. The composite TDC signal may be implemented as a back-up signal in the event of CPS signal line and/or vehicle CAN system degradation. In some embodiments, the composite TDC signal may be transmitted across a single wire. An example composite TDC signal pulse train is shown in FIG. 3 and will be discussed in further detail below.

In some embodiments, a V-engine configuration may be implemented which utilizes two or more cam shafts for each of the cylinder banks of the engine. In such a configuration, the composite TDC signal may be generated based on both of the CAM signals corresponding to the intake valves of the respective cylinder banks. By using two CAM signals to generate the composite TDC signal synchronization of the VCU to the ECM may be achieved in less than half the number of engine degrees as compared to a composite TDC signal generated from a single CAM signal. In this way, the amount of time for synchronization to be achieved may be reduced. The rapid synchronization may be particularly applicable or beneficial for cold start procedures. Further, it will be appreciated that in some embodiments, the composite TDC signal may be generated based on a suitable number of CAM signals corresponding to the number of CAM shafts used to control cylinder intake valves of the engine. In some embodiments, multiple composite TDC signals may be generated based on different CAM signals.

ECM to VCU interface 142 may include VCU status line 208 that may transmit status information from the VCU to the ECM indicating whether or not the VCU is operational and synchronized with the ECM. In particular, the VCU may calculate an internal version of the composite TDC signal that is sent from the ECM to the VCU. The VCU may transmit the internally calculated composite TDC pulse train to the ECM via VCU status line 208. The VCU generated composite TDC signal will be described in further detail below with reference to FIG. 4.

Furthermore, it will be appreciated that either the ECM or the VCU may compare and calculate the phasing of the TDC signals to determine that the ECM and VCU are synchronized within a calibratable phase. It will be appreciated that the above described comparison may be an analysis of where one signal edge occurs with respect to the other signal edge and the comparison may be based on time or position. ECM to VCU synchronization and error detection will be discussed in further detail below with reference to FIG. 5. The VCU status signal may be implemented as a back-up signal in the event of dedicated CAN line degradation.

In some embodiments, the VCU status signal may be transmitted across a single wire. By utilizing a dedicated control signal line of the interface between the ECM and VCU to sending pulse trains that contain cylinder identification, monitoring synchronization between the control modules may be performed in an accurate and robust manner, which in turn may result in improved control accuracy of the intake valves. Furthermore, implementation of the composite TDC and VCU status signal may make the interface more robust since the signal lines may be used to identify crank angle and cylinder position in the case of degradation of the CPS and/or dedicated CAN signal lines.

ECM to VCU interface 142 may include valve closure degradation (VCD) line 210 that may transmit intake valve closure degradation signals detected by the VCU to the ECM. In response to receiving a VCD signal, the ECM may adjust fuel and spark operations to account for a VCD. In one example, the VCU may transmit a valve closure degradation (VCD) signal over four dedicated signal lines to the engine control module (ECM). The VCD signal may be transmitted from the VCU to the ECM using four single wires. In the case of an eight cylinder engine, each VCD signal line may be used to transmit the VCD signal for two cylinders. Further, upon the VCU detecting a VCD on one or more of the intake valves, the VCU may hold the VCD signal lines that are associated with the cylinders that have a VCD, low until a spark/fuel disable message is received from the ECM. This confirms that the cylinder(s) with a VCD has had the spark and fuel disabled. In the alternative, the VCD can be cleared by the VCU. Otherwise, during standard operation the VCU may hold the signal lines high.

In one example configuration, in an eight cylinder engine system, the VCU may transmit a message over the dedicated CAN link to the ECM that identifies the cylinders that have either a VCD or a VCD signal line degradation, i.e. a signal line with an open circuit, a short to ground or a short to power degradation. The VCD message sent over the CAN may include eight bits, one for each cylinder, where each bit is set to 0 if there is no valve closure or signal line degradation and is set to 1 if there is a valve closure or signal line degradation. Further, the ECM may receive and process the VCU VCD signal CAN message to disable spark and fuel on the cylinders that have a bit set to 1. After the ECM has disabled fuel and spark on the cylinders identified in the VCU VCD signal CAN message, the ECM may send a spark/fuel disable CAN message to the VCU. The ECM spark/fuel disable message may have the same structure as the VCU VCD signal CAN message, i.e. one bit per cylinder, with the bit set to 1 if the fuel and spark have been disabled on a given cylinder.

ECM to VCU interface 142 may include Key-on signal line 212 that may transmit a signal from the ECM to the VCU indicating that the key is in the ignition. The key-on signal may be utilized to initiate the VCU system so that the VCU may be capable of accepting and delivering valve actuation commands from the ECM within a suitable amount of time after start-up. Upon initiation of the VCU based on the key-on signal, the VCU may send a VCU ready signal to the ECM.

It will be appreciated that in some embodiments of the ECM to VCU interface, various signals or signal lines may be omitted and/or additional signals, signal lines, and/or messages may be sent between the ECM and VCU to provide control of valve operation and corresponding feedback.

FIG. 3 shows an example pulse train of a position indication signal, more particularly, the composite TDC signal generated by the ECM and sent via composite TDC line 206 (See FIG. 2) from the ECM to the VCU. In the illustrated example, the composite TDC signal contains a rising edge every 90 CA degrees which occurs 36 CA degrees before TDC of each cylinder. In addition, the pulses are each 30 degrees in width except for the pulse which is aligned with TDC of cylinder number one, which has a 60 CA degree width. The 60 CA degree-wide pulse may be used to identify TDC of cylinder number one. Accordingly, the falling edge of the pulse for cylinder number one may occur 24 CA degrees after TDC of the compression stroke and the falling edges of the pulses for the other cylinders may occur 6 CA degrees before TDC of the compression stroke. By increasing the width of the pulse corresponding to cylinder number one, the cylinder may be easily identified and system performance monitoring (e.g. valve timing) accuracy may be improved. The composite TDC pulse train may provide a back-up to the crank position signal (CPS), and the cylinder number one identifier included in the CAN messaging signals in the event that either the CPS signal line, the vehicle CAN link, or both signal lines degrade.

Figure 4:
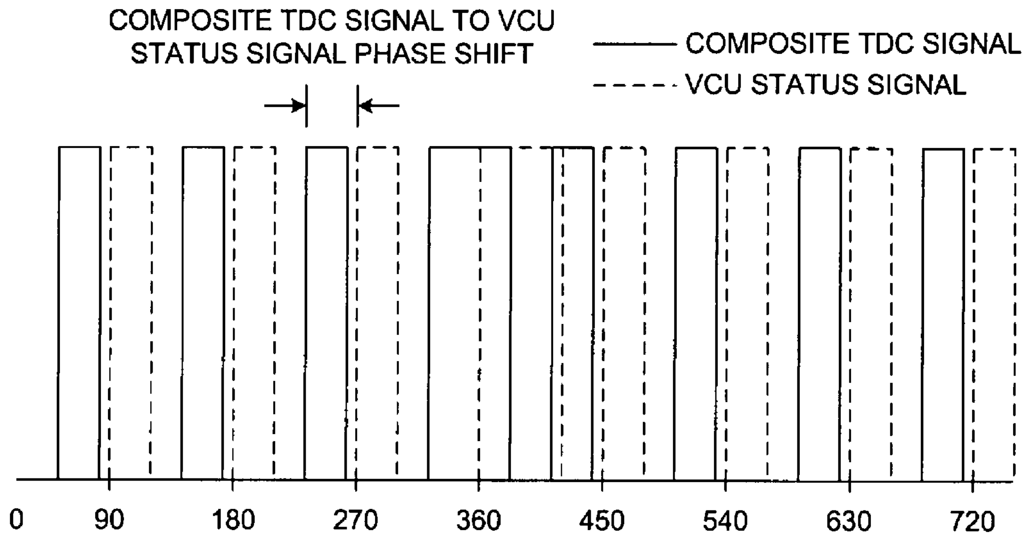
FIG. 4 shows the pulse train of FIG. 3 overlaid with a phase-shifted pulse train generated by the valve control unit.

As discussed above, the VCU may send a VCU status signal to the ECM via VCU status signal line 208 (see FIG. 2) that may provide operational feedback of the intake valves to the ECM. In one example, a control strategy may be employed to utilize the feedback from the VCU to check for errors in synchronization between the ECM and the VCU. In particular, the VCU may internally calculate a pulse train based on the internal cylinder timing of the VCU and may include the same pulse train characteristics as the composite TDC pulse train generated by the ECM shown in FIG. 3. Upon receiving the composite TDC signal from the ECM, the VCU may send the VCU status signal to the ECM. As shown in FIG. 4, the VCU status signal may generate the same pulse train as the composite TDC signal except that the VCU status signal may be out of phase. The phase shift may result in a synchronization error between the VCU and the ECM. The phase shift and/or synchronization error may be attributed to VCU software errors, CPS signal processing errors and/or VCU hardware degradation, for example.

The ECM generated composite TDC signal pulse train is shown as a solid line and the VCU status pulse train is shown as a dashed line. Each of the respective pulse trains may indicate the internal timing of each the respective control modules. Accordingly, given both the composite TDC signal and VCU status signal it is possible for either the ECM or the VCU to measure VCU to ECM synchronization by calculating the phase shift of these two signals, and subtracting transmission latency values.

Although FIG. 4 shows the VCU status signal out of phase across all cylinders, it will be appreciated that the VCU may be out of synchronization with the ECM on a cylinder by cylinder basis that may result in a VCU to ECM synchronization error. In some cases, a VCU synchronization error may occur that results in a single cylinder or a sub-group of cylinders being out of synchronization with the ECM fuel and spark commands.

Figure 5:
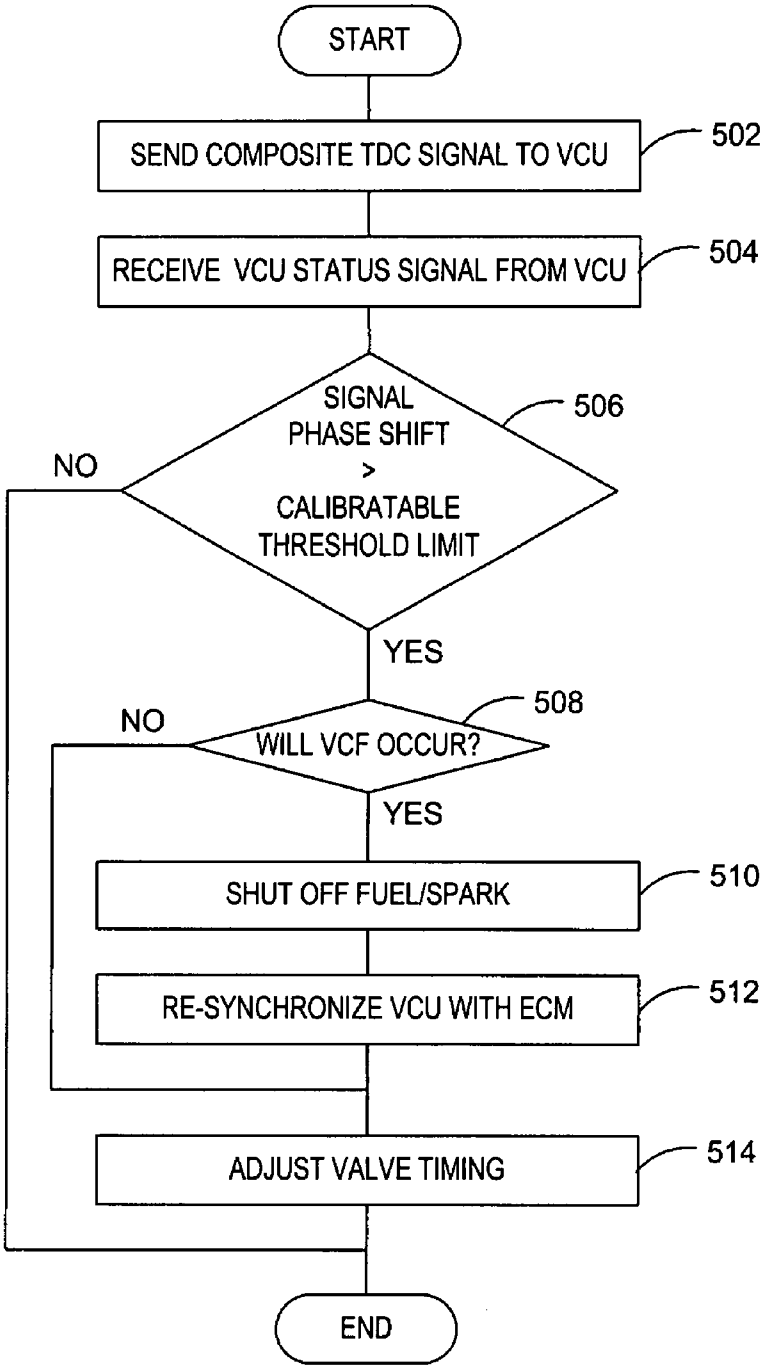
FIG. 5 shows a flow chart depicting an example approach for detecting synchronization errors of communications between the electronic control module and the valve control unit of the engine system of FIG. 1.

FIG. 5 illustrates one embodiment of a method for detecting synchronization errors between the ECM and the VCU that may be implemented in an iEVA engine system as described above. At 502, the method includes sending a composite TDC signal to the VCU from the ECM. The composite TDC signal may include a pulse train that indicates the crank position and may include a cylinder one identifier pulse. An example composite TDC signal is shown in FIG. 3

At 504, the method may include receiving a VCU status signal from the VCU at the ECM. The VCU status signal may be a reflection of the composite TDC signal sent to the VCU. That is, the VCU status signal may be made identical to the composite TDC signal albeit delayed in time. However, the VCU status signal may be calculated based on the internal clock of the VCU. Accordingly, the VCU status signal may be shifted or out of phase with the composite TDC signal of the ECM based on timing differences between the two control modules as well or other internal software and/or hardware degradation.

At 506, the method may include comparing the phase shift between the composite TDC signal and the VCU status signal to a calibratible threshold limit. In one example of the method, the threshold limit may be calibrated based on engine speed because the minimum duration of valve lift may vary based on engine speed. For example, at low engine speeds where the effective minimum valve duration relative to crank angle may be shorter, a VCU status signal pulse train that is phase shifted 90 CA degrees after the ECM composite TDC signal may not cause a valve closure degradation since the intake valve may close before spark is performed. On the other hand, at high engine speed where minimum valve duration may be longer relative to crank angle, a VCU status signal pulse train that is phase shifted 90 CA degrees after the ECM composite TDC signal may cause a valve closure degradation since the intake valve may be open when spark is performed. It will be appreciated that the above described comparison may be an analysis of where one edge occurs with respect to the other signal edge and the comparison may be time based or position based. If is determined that the phase shift between the ECM pulse train and the VCU pulse train is beyond the threshold limit, the method continues to 508. Otherwise, if it is determined that the phase shift between the ECM pulse train and the VCU pulse train is within the threshold limit, the method ends.

At 508, the method may include determining whether a valve degradation is likely to occur based on the phase shifted VCU pulse train. As one example, valve degradation may be exhibited by an error in the valve trajectory. That is, the valve may not follow a desired trajectory and may not be closed during engine spark. In some embodiments, valve closure degradations may be determined by the VCU on a cylinder by cylinder basis. The VCU may send valve closure degradation information to the ECM via a dedicated CAN message. If it is determined that a valve closure degradation is likely to occur, the method continues to 510. Otherwise, if it is determined that a valve closure degradation is not likely to occur, the method moves to 514.

At 510, the method may include shutting off spark and/or fuel delivered to cylinder in which the valve closure degradation may occur. By shutting off spark and/or fuel to the cylinder combustion may be prevented which in turn may reduce noise, vibration, harshness (NVH) effects by preventing backfire into the intake port, for example.

At 512, the method may include re-synchronizing the VCU with the ECM. In one example, the VCU internal clock may be reset based on the composite TDC signal sent from the ECM. By re-synchronizing the VCU with the ECM intake valve control accuracy may be improved and intake valve control degradations may be reduced.

At 514, the method may include adjusting the valve timing of the intake valve to compensate for the phase shift. In some cases, valve timing may be adjusted on a cylinder by cylinder basis to correct synchronization errors corresponding to individual cylinders or sub-groups of cylinders. It will be appreciated that under some conditions, the valve timing may not be adjusted.

In some embodiments, synchronization errors may be determined in the VCU instead of the ECM. If the VCU to ECM synchronization error is calculated within the VCU then the resulting value may be transmitted to the ECM over the CAN link to allow the ECM to process this information for engine control purposes, e.g. shut off fuel and/or spark.

Note that the signal timings contained in this description are exemplary and are not intended to limit the scope or breadth of this description. Also note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used.

Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to “an” element or “a first” element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A system for controlling a multiple cylinder internal combustion engine with electromagnetic valve actuation, comprising:

at least one cylinder with an engine cylinder valve;

a second controller operably coupled to the engine cylinder valve, said second controller configured to adjust at least one of the valve opening and closing timing of the engine cylinder valve; and a first controller connected with the second controller over a first link and a second link, wherein the first controller is configured to send an engine position indication signal to the second controller over the first link and receive a status signal from the second controller over the second link, and wherein the first controller outputs a synchronization degradation signal responsive to a synchronization error between the engine position indication signal and the status signal.

2. The system of claim 1, wherein if the engine position indication signal becomes degraded, the second controller and first controller can be synchronized by comparing an internal first controller engine position indication edge timing to the status signal edge timing.

3. The system of claim 1, wherein if the status signal degrades, the second controller and the first controller can be synchronized by comparing an engine timing that is internal to the second controller and an edge timing of the engine position indication signal.

4. The system of claim 1, wherein if the engine position indication and at least a status signal is degraded, a cylinder identifier timing can be transmitted from the second controller to the first controller, and the first controller can detect synchronization errors between the second controller and the first controller.

5. The system of claim 1, wherein the second controller is further configured to adjust all the intake valves in the engine to synchronize the second controller and the first controller.

6. The system of claim 1, wherein the engine position indication signal is a composite top dead center (TDC) signal.

7. The system of claim 6, wherein the status signal is a reflection of the composite top dead center signal based upon the internal timing of the second controller on a cylinder by cylinder basis.

8. The system of claim 6, wherein the internal combustion engine is a V-engine having different cylinder banks, and wherein the composite top dead center signal is generated based on a plurality of camshaft position signals, at least two of the plurality of camshaft position signals corresponding to the different cylinder banks of the internal combustion engine.

9. The system of claim 1, further comprising the first controller configured to adjust at least one of engine intake valve timing, engine fueling, and spark ignition timing based on the synchronization degradation signal.

10. The system of claim 9, wherein the first controller is further configured to adjust valve timing on a cylinder by cylinder basis to correct the synchronization error.

11. A method for controlling an internal combustion engine having at least a cylinder using electronic valve actuation, comprising:

sending an engine position indication signal from a first controller to a second controller over a first link;

sending a status signal from the second controller to the first controller over a second link;

and synchronizing the second controller and the first controller according to the engine position indication signal and the status signal.

12. The method of claim 11, wherein the engine position indication signal is a composite top dead center (TDC) signal.

13. The method of claim 11, wherein the status signal is a reflection of the composite top dead center signal based on the internal timing of the second controller on a cylinder by cylinder basis.

14. The method of claim 11, further comprising calculating a synchronization error based on the engine position indication signal and the status signal and adjusting the valve timing of the at least one cylinder on a cylinder by cylinder basis to correct the synchronization error.

15. The method of claim 11, wherein if the engine position indication signal degrades, the method further comprising synchronizing the second controller and first controller by comparing an internal first controller engine position indication edge timing with the status signal edge timing.

16. The method of claim 11, wherein if the engine position indication and status signals are degraded, the method further comprising transmitting a cylinder identifier timing from the second controller to the first controller, and the first controller detecting synchronization errors between the second controller and the first controller.

17. The method of claim 11, wherein if the status signal degrades, the method further comprising synchronizing the second controller and first controller by comparing an engine timing that is internal to the second controller with the engine position indication signal edge timing.

18. The method of claim 17, further comprising sending from the second controller to the first controller, a synchronization error over a control area network (CAN) link.

19. A computer storage medium having instructions encoded therein for operating a multiple cylinder internal combustion engine with electromagnetic valve actuation, said medium comprising:

code to send an engine position indication signal from a first controller to a second controller over a first link;

code to send a status signal from the second controller to the first controller over a second link;

code to calculate a synchronization error between the second controller and the first controller; and, code to synchronize the valve controller and the first controller according to the status signal.

20. The medium of claim 19, wherein the engine position indication is a composite top dead center signal.

21. The medium of claim 19, wherein the status signal is a reflection of the composite top dead center signal based on the internal timing of the second controller on a cylinder by cylinder basis.

22. The medium of claim 21, wherein if the composite top dead center signal degrades, the medium further comprising code to synchronize the second controller and first controller by comparing an internal first controller top dead center edge timing with the status signal edge timing.

23. The medium of claim 19, wherein if the engine position indication and status signals are degraded, the medium further comprising code to transmit a cylinder identifier timing from the second controller to the first controller, and the first controller to detect a second controller to first controller synchronization error.

24. The medium of claim 19, wherein if the status signal degrades, the medium further comprising code to synchronize the second controller and first controller by comparing an engine timing internal to the second controller with the engine position indication signal edge timing.

25. The medium of claim 24, further comprising code to send the first controller a synchronization error over a control area network (CAN) link from the second controller.

* * * * *